Sept. 26, 1933.  J. TRUMM  1,928,038
SALT AND PEPPER SHAKER
Filed July 17, 1931
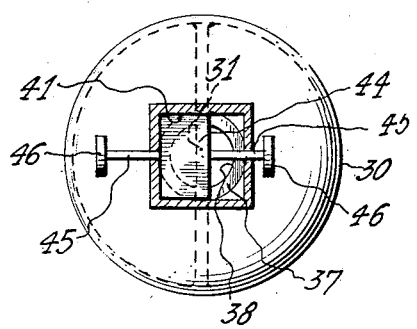
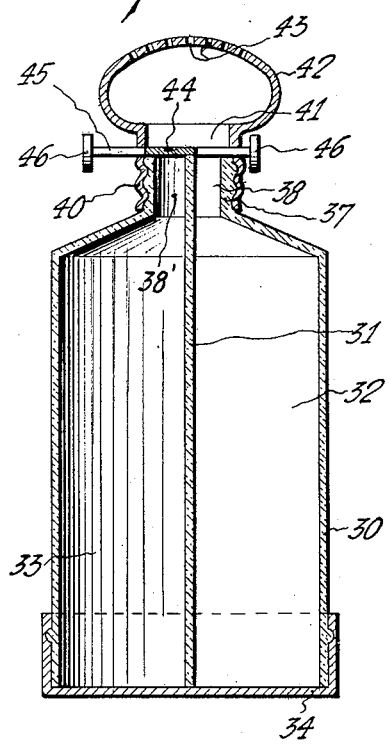
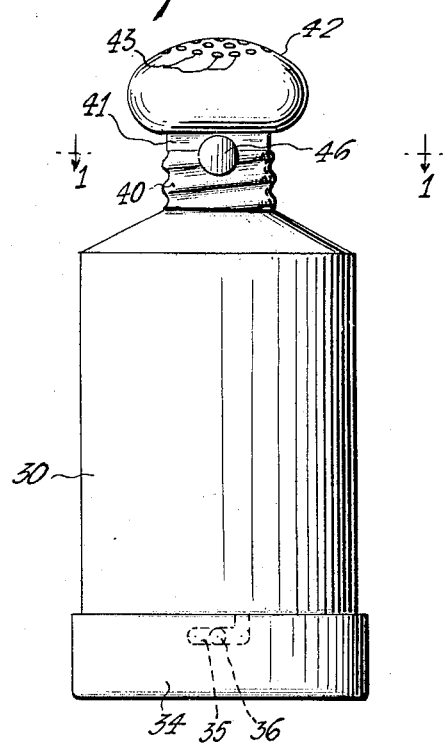
INVENTOR-
JAKOB TRUMM
BY
ATTORNEY- Patented Sept. 26, 1933

1,928,038

UNITED STATES PATENT OFFICE 1,928,038

SALT AND PEPPER SHAKER

Jakob Trumm, Bayville, N. Y.

Application July 17, 1931. Serial No. 551,348

1 Claim. (Cl. 65—45)

This invention relates to salt and pepper shakers, and it is the principal object of my invention to provide one single container divided into two compartments allowing dispensation of either salt or pepper as desired.

A further object of my invention is the provision of a combined pepper and salt shaker divided into two chambers by a median partition, having a perforated cap and a two handle operated plate closing or opening the passage to one or the other chambers for the dispensation of either pepper or salt, as desired through the cap while a removable bottom allows refilling of the chambers.

It is also an object of my invention to provide a simple and inexpensive combination pepper and salt shaker, yet strong and efficient in operation, avoiding the use of separate vessels.

These and other objects and advantages of my invention will become known as the description thereof proceeds and will then be specifically defined in the appended claim.

In the accompanying drawing forming a material part of this disclosure:

Fig. 1 is a transverse sectional view of an embodiment of the invention taken on line 1—1 of Figure 3.

Fig. 2 is a longitudinal sectional view therethrough.

Fig. 3 is a side elevational view of the salt and pepper shaker.

The invention consists of a cylindrical container 30 divided by a longitudinal central partition 31 into two equal compartments 32—33 to contain different powdered substances, as table condiments.

At the lower end is a cap 34 having a slot 35 suited to engage a pin 36 set in the wall of the container, these elements constituting in effect a bayonet-joint type of closure.

The opposite, upper end of the container has conically inclined convergent walls blending into a circular neck 37 screw threaded exteriorally, the partition being shaped to conform to the walls and extending level with the neck extremity.

A sleeve 40 is fitted to engage the neck threads, this sleeve merging into the rectangular portion 41 of a cap having a spherically shaped hollow bulbous head 42 provided with a plurality of dispensing perforations 43.

A shutter plate 44 is arranged to slide freely within the rectangular chamber 41, in close proximity to the top of the neck openings 37—38 the shutter being provided with stems 45 slidable through openings in two of the opposed walls of the chamber and provided with actuating knobs 46 extending into position for easy access, and by which the shutter 40 may be moved to selectively cover either of the openings 37—38, thus allowing one or the other of the substances in the container to be dispensed at will and preventing the other from flowing.

It will be understood that I have disclosed the preferred forms of my invention only and that I may make such changes therein as come within the scope of the appended claim without departure from the invention as disclosed.

Having thus described my invention what I claim as new and desire to secure by Letters Patent is:

A condiment dispenser comprising a cylindrical container having a removable closure at the bottom, a contracted top terminating in an exteriorly threaded neck, a central longitudinal partition in said container extending into the neck to the end thereof, a sleeve engaged on said neck, a rectangular chamber on the upper end of said sleeve, a perforate bulbous head on said chamber, a shutter movable in said chamber to cover the neck on either side of said partition selectively, and to open the opposite side thereof simultaneously, and means to actuate said shutter.

JAKOB TRUMM.